US009900174B2

(12) United States Patent
Gamberini

(10) Patent No.: US 9,900,174 B2
(45) Date of Patent: Feb. 20, 2018

(54) MULTI-USER GEOFENCING FOR BUILDING AUTOMATION

(71) Applicant: Honeywell International Inc., Morristown, NJ (US)

(72) Inventor: Rudolph Gamberini, East Northport, NY (US)

(73) Assignee: Honeywell International Inc., Morris Plains, NJ (US)

( * ) Notice: Subject to any disclaimer, the term of this patent is extended or adjusted under 35 U.S.C. 154(b) by 236 days.

(21) Appl. No.: 14/640,984

(22) Filed: Mar. 6, 2015

(65) Prior Publication Data

US 2016/0261424 A1 Sep. 8, 2016

(51) Int. Cl.
*G05B 13/00* (2006.01)
*G05B 15/00* (2006.01)
(Continued)

(52) U.S. Cl.
CPC .......... *H04L 12/2803* (2013.01); *G05B 15/02* (2013.01); *H04L 12/2825* (2013.01); *H04W 4/021* (2013.01)

(58) Field of Classification Search
CPC .. G05B 2219/2642; G05B 2219/25011; H04L 12/282; H04L 12/2823; H04W 4/021; H04W 4/043; H04W 4/025; H04W 4/04
See application file for complete search history.

(56) References Cited

U.S. PATENT DOCUMENTS 6,255,988 B1 7/2001 Bischoff
6,356,282 B2 3/2002 Roytman et al.
(Continued)

FOREIGN PATENT DOCUMENTS

AU 2015201441 A1 10/2015
CN 101689327 5/2013
(Continued)

OTHER PUBLICATIONS

Balaji et al., "Sentinel: Occupancy Based HVAC Actuation Using Existing WiFi Infrastructure Within Commercial Buildings," SenSys '13, 14 pages, Nov. 11-15, 2015.
(Continued)

*Primary Examiner* — Thomas Lee
*Assistant Examiner* — Zhipeng Wang
(74) *Attorney, Agent, or Firm* — Seager, Tufte & Wickhem, LLP

(57) ABSTRACT

A building automation server includes a memory, a communication interface and a controller that is coupled to the memory and the communication interface. The memory is for storing a database comprising a plurality of user accounts, wherein each user account includes an associated building location of a building, an associated geofence defined relative to the building location, and one or more group member ID's, wherein each of the one or more group member ID's is associated with a corresponding mobile device with location services, and each user account identifies a geofence status for each of the one or more group member ID's, where the geofence status indicates whether the corresponding mobile device for each of the one or more group member ID is within the geofence associated with the user account or outside of the geofence.

22 Claims, 10 Drawing Sheets

(51) Int. Cl.
　　　*G05B 21/00*　　　(2006.01)
　　　*G05D 23/00*　　　(2006.01)
　　　*G01M 1/38*　　　(2006.01)
　　　*H04L 12/28*　　　(2006.01)
　　　*H04W 4/02*　　　(2018.01)
　　　*G05B 15/02*　　　(2006.01)

(56) References Cited

U.S. PATENT DOCUMENTS

| | | | |
|---|---|---|---|
| 6,400,956 B1 | 6/2002 | Richton | |
| 6,478,233 B1 | 11/2002 | Shah | |
| 6,529,137 B1 | 3/2003 | Roe | |
| 6,604,023 B1 | 8/2003 | Brown et al. | |
| 6,665,613 B2 | 12/2003 | Duvall | |
| 6,909,891 B2 | 6/2005 | Yamashita et al. | |
| 6,990,335 B1 | 1/2006 | Shamoon et al. | |
| 7,083,109 B2 | 8/2006 | Pouchak | |
| 7,127,734 B1 | 10/2006 | Amit | |
| 7,130,719 B2 | 10/2006 | Ehlers et al. | |
| 7,155,305 B2 | 12/2006 | Hayes et al. | |
| D535,573 S | 1/2007 | Barton et al. | |
| 7,159,789 B2 | 1/2007 | Schwendinger et al. | |
| 7,257,397 B2 | 8/2007 | Shamoon et al. | |
| 7,327,250 B2 | 2/2008 | Harvey | |
| 7,385,500 B2 | 6/2008 | Irwin | |
| D580,801 S | 11/2008 | Takach et al. | |
| 7,451,017 B2 | 11/2008 | McNally | |
| 7,510,126 B2 | 3/2009 | Rossi et al. | |
| 7,571,865 B2 | 8/2009 | Nicodem et al. | |
| 7,614,567 B2 | 11/2009 | Chapman et al. | |
| 7,636,604 B2 | 12/2009 | Bergman et al. | |
| 7,668,532 B2 | 2/2010 | Shamoon et al. | |
| 7,768,393 B2 | 8/2010 | Nigam | |
| 7,801,646 B2 | 9/2010 | Amundson et al. | |
| 7,812,274 B2 | 10/2010 | Dupont et al. | |
| 7,839,275 B2 | 11/2010 | Spalink et al. | |
| 7,908,211 B1 | 3/2011 | Chen et al. | |
| 7,949,615 B2 | 5/2011 | Ehlers et al. | |
| 7,953,518 B2 | 5/2011 | Kansal et al. | |
| 7,973,678 B2 | 7/2011 | Petricoin, Jr. et al. | |
| 8,018,329 B2 | 9/2011 | Morgan et al. | |
| 8,064,935 B2 | 11/2011 | Shamoon et al. | |
| 8,065,342 B1 | 11/2011 | Borg et al. | |
| 8,095,340 B2 | 1/2012 | Brown | |
| 8,115,656 B2 | 2/2012 | Bevacqua et al. | |
| 8,125,332 B2 | 2/2012 | Curran et al. | |
| 8,180,492 B2 | 5/2012 | Steinberg | |
| 8,195,313 B1 | 6/2012 | Fadell et al. | |
| 8,205,244 B2 | 6/2012 | Nightingale et al. | |
| 8,232,877 B2 | 7/2012 | Husain | |
| 8,255,090 B2 | 8/2012 | Frader-Thompson et al. | |
| 8,269,620 B2 | 9/2012 | Bullemer et al. | |
| 8,280,536 B1 | 10/2012 | Fadell et al. | |
| 8,301,765 B2 | 10/2012 | Goodman | |
| 8,332,055 B2 | 12/2012 | Veillette | |
| 8,350,697 B2 | 1/2013 | Trundle et al. | |
| 8,386,082 B2 | 2/2013 | Oswald | |
| 8,390,473 B2 | 3/2013 | Kryzanowski et al. | |
| 8,412,381 B2 | 4/2013 | Nikovski et al. | |
| 8,412,654 B2 | 4/2013 | Montalvo | |
| 8,428,867 B2 | 4/2013 | Ashley, Jr. et al. | |
| 8,433,344 B1 | 4/2013 | Virga | |
| 8,442,695 B2 | 5/2013 | Imes et al. | |
| 8,457,797 B2 | 6/2013 | Imes et al. | |
| 8,509,954 B2 | 8/2013 | Imes et al. | |
| 8,531,294 B2 | 9/2013 | Slavin et al. | |
| 8,554,374 B2 | 10/2013 | Lunacek et al. | |
| 8,554,714 B2 | 10/2013 | Raymond et al. | |
| 8,560,127 B2 | 10/2013 | Leen et al. | |
| 8,571,518 B2 | 10/2013 | Imes et al. | |
| 8,587,445 B2 | 11/2013 | Rockwell | |
| 8,620,841 B1 | 12/2013 | Filson et al. | |
| 8,626,344 B2 | 1/2014 | Imes et al. | |
| 8,630,741 B1 | 1/2014 | Matsuoka et al. | |
| 8,648,706 B2 | 2/2014 | Ranjun et al. | |
| 8,670,783 B2 | 3/2014 | Klein | |
| 8,686,841 B2 | 4/2014 | Macheca et al. | |
| 8,718,826 B2 | 5/2014 | Ramachandran et al. | |
| 8,798,804 B2 | 8/2014 | Besore et al. | |
| 8,810,454 B2 | 8/2014 | Cosman | |
| 8,812,024 B2 | 8/2014 | Obermeyer et al. | |
| 8,812,027 B2 | 8/2014 | Obermeyer et al. | |
| 8,840,033 B2 | 9/2014 | Steinberg | |
| 8,874,129 B2 | 10/2014 | Forutanpour et al. | |
| 8,886,178 B2 | 11/2014 | Chatterjee | |
| 8,890,675 B2 | 11/2014 | Ranjan et al. | |
| 8,909,256 B2 | 12/2014 | Fraccaroli | |
| 8,918,219 B2 | 12/2014 | Sloo et al. | |
| 8,941,489 B2 | 1/2015 | Sheshadri et al. | |
| 8,965,401 B2 | 2/2015 | Sheshadri et al. | |
| 8,965,406 B2 | 2/2015 | Henderson | |
| 9,026,261 B2 | 5/2015 | Bukhin et al. | |
| 9,033,255 B2 | 5/2015 | Tessier et al. | |
| 9,055,475 B2 | 6/2015 | Lacatus et al. | |
| 9,071,453 B2 | 6/2015 | Shoemaker et al. | |
| 9,113,298 B2 | 8/2015 | Qiu | |
| 9,168,927 B2 | 10/2015 | Louboutin | |
| 9,183,530 B2 | 11/2015 | Schwarz et al. | |
| 9,210,545 B2 | 12/2015 | Sabatelli et al. | |
| 9,215,560 B1 | 12/2015 | Jernigan | |
| 9,219,983 B2 | 12/2015 | Sheshadri et al. | |
| 9,280,559 B1 | 3/2016 | Jones | |
| 9,288,620 B2 | 3/2016 | Menendez | |
| 9,363,638 B1 | 3/2016 | Jones | |
| 9,307,344 B2 | 4/2016 | Rucker et al. | |
| 9,311,685 B2 | 4/2016 | Harkey et al. | |
| 9,313,320 B2 | 4/2016 | Zeilingold et al. | |
| 9,363,772 B2 | 6/2016 | Burks | |
| 9,396,344 B1 | 7/2016 | Jones | |
| 9,414,422 B2 | 8/2016 | Belghoul et al. | |
| 9,433,681 B2 | 9/2016 | Constien et al. | |
| 9,491,577 B1 | 11/2016 | Jones | |
| 9,589,435 B2 | 3/2017 | Finlow-Bates | |
| 9,635,500 B1 | 4/2017 | Becker et al. | |
| 9,645,589 B2 | 5/2017 | Leen et al. | |
| 2002/0147006 A1 | 10/2002 | Coon et al. | |
| 2005/0172056 A1 | 8/2005 | Ahn | |
| 2006/0063522 A1 | 3/2006 | McFarland | |
| 2006/0097063 A1 | 5/2006 | Zeevi | |
| 2007/0037605 A1 | 2/2007 | Logan | |
| 2007/0099626 A1 | 5/2007 | Lawrence et al. | |
| 2007/0114295 A1 | 5/2007 | Jenkins | |
| 2007/0249319 A1 | 10/2007 | Faulkner et al. | |
| 2008/0094230 A1 | 4/2008 | Mock et al. | |
| 2010/0034386 A1 | 2/2010 | Choong et al. | |
| 2010/0042940 A1 | 2/2010 | Monday et al. | |
| 2010/0081375 A1 | 4/2010 | Rosenblatt et al. | |
| 2010/0127854 A1 | 5/2010 | Helvick et al. | |
| 2010/0156628 A1 | 6/2010 | Ainsbury et al. | |
| 2010/0261465 A1 | 10/2010 | Rhoads et al. | |
| 2011/0153525 A1 | 6/2011 | Benco et al. | |
| 2011/0314144 A1* | 12/2011 | Goodman | G06Q 10/06 709/224 |
| 2012/0172027 A1 | 7/2012 | Partheesh et al. | |
| 2012/0191257 A1 | 7/2012 | Corcoran et al. | |
| 2012/0209730 A1 | 8/2012 | Garrett | |
| 2012/0259466 A1* | 10/2012 | Ray | G05B 15/02 700/275 |
| 2012/0284769 A1 | 11/2012 | Dixon et al. | |
| 2013/0073094 A1 | 3/2013 | Knapton et al. | |
| 2013/0204441 A1 | 8/2013 | Sloo et al. | |
| 2013/0225196 A1 | 8/2013 | James et al. | |
| 2013/0231137 A1 | 9/2013 | Hugie et al. | |
| 2013/0310053 A1 | 11/2013 | Srivastava et al. | |
| 2013/0318217 A1 | 11/2013 | Imes et al. | |
| 2013/0331087 A1 | 12/2013 | Shoemaker et al. | |
| 2014/0031989 A1 | 1/2014 | Bergman et al. | |
| 2014/0031991 A1 | 1/2014 | Bergman et al. | |
| 2014/0045482 A1 | 2/2014 | Bisson et al. | |
| 2014/0100835 A1 | 4/2014 | Majumdar et al. | |

(56) References Cited

U.S. PATENT DOCUMENTS

| | | | |
|---|---|---|---|
| 2014/0156087 A1 | 6/2014 | Amundson | |
| 2014/0164118 A1 | 6/2014 | Polachi | |
| 2014/0172176 A1 | 6/2014 | Deilmann et al. | |
| 2014/0200718 A1 | 7/2014 | Tessier | |
| 2014/0244048 A1 | 8/2014 | Ramachandran et al. | |
| 2014/0266635 A1 | 9/2014 | Roth et al. | |
| 2014/0277762 A1 | 9/2014 | Drew | |
| 2014/0302879 A1 | 10/2014 | Kim et al. | |
| 2014/0313032 A1* | 10/2014 | Sager | H04Q 9/00 340/539.17 |
| 2014/0330435 A1 | 11/2014 | Stoner et al. | |
| 2014/0337123 A1 | 11/2014 | Neurenberg et al. | |
| 2014/0349672 A1 | 11/2014 | Kern et al. | |
| 2014/0370911 A1 | 12/2014 | Gorgenyi et al. | |
| 2015/0065161 A1 | 3/2015 | Ganesh et al. | |
| 2015/0094860 A1* | 4/2015 | Finnerty | G05B 15/02 700/275 |
| 2015/0140994 A1 | 5/2015 | Partheesh et al. | |
| 2015/0141045 A1 | 5/2015 | Qiu et al. | |
| 2015/0159895 A1 | 6/2015 | Quam et al. | |
| 2015/0163631 A1 | 6/2015 | Quam et al. | |
| 2015/0163945 A1 | 6/2015 | Barton et al. | |
| 2015/0181382 A1* | 6/2015 | McDonald | H04L 67/18 455/456.3 |
| 2015/0186497 A1 | 7/2015 | Patton et al. | |
| 2015/0237470 A1 | 8/2015 | Mayor et al. | |
| 2015/0271638 A1 | 9/2015 | Menayas et al. | |
| 2015/0301543 A1 | 10/2015 | Janoso et al. | |
| 2015/0338116 A1 | 11/2015 | Furuta et al. | |
| 2015/0370272 A1 | 12/2015 | Reddy et al. | |
| 2015/0372832 A1 | 12/2015 | Kortz et al. | |
| 2016/0007156 A1 | 1/2016 | Chiou et al. | |
| 2016/0054865 A1 | 2/2016 | Kerr et al. | |
| 2016/0057572 A1* | 2/2016 | Bojorquez Alfaro | H04W 4/021 455/411 |
| 2016/0142872 A1 | 5/2016 | Nicholson et al. | |
| 2016/0223998 A1* | 8/2016 | Songkakul | G05B 15/02 |
| 2017/0026506 A1 | 1/2017 | Haepp et al. | |

FOREIGN PATENT DOCUMENTS

| | | |
|---|---|---|
| CN | 103175287 A | 6/2013 |
| CN | 104704863 A | 6/2015 |
| CN | 105318499 A | 2/2016 |
| DE | 102013226390 A1 | 6/2015 |
| EP | 1515289 | 3/2005 |
| EP | 2607802 EP | 6/2013 |
| EP | 2675195 A2 | 12/2013 |
| EP | 2675195 A2 | 12/2015 |
| EP | 3001116 A1 | 3/2016 |
| JP | 2011203841 A | 10/2011 |
| JP | 2012109680 A | 6/2012 |
| MX | 2012000906 | 9/2012 |
| WO | 2006055334 A1 | 5/2006 |
| WO | WO 2009/034720 | 3/2009 |
| WO | WO 2009/036764 | 3/2009 |
| WO | WO 2009/067251 | 5/2009 |
| WO | WO 2011/011404 | 1/2011 |
| WO | 2011121299 A1 | 10/2011 |
| WO | WO 2012/000107 | 1/2012 |
| WO | 2012068517 A1 | 5/2012 |
| WO | WO 2013/170791 | 11/2013 |
| WO | WO 2014/016705 | 1/2014 |
| WO | WO 2014/047501 | 3/2014 |
| WO | 2014055939 A1 | 4/2014 |
| WO | WO 2014/144323 | 9/2014 |
| WO | 2014200524 A2 | 12/2014 |
| WO | WO 2014/197320 | 12/2014 |
| WO | 2015047739 A1 | 4/2015 |
| WO | 2015089116 A1 | 6/2015 |
| WO | 2015164400 A1 | 10/2015 |

OTHER PUBLICATIONS

"Petition for Inter Partes Review of U.S. Pat. No. 8,571,518 Pursuant to 35 U.S.C. 311-319, 37 CFR 42," Inventor Imes et al., dated Oct. 29, 2014.

Do, "Programmable Communicating Thermostats for Demand Response in California," DR ETD Workshop, 26 pages, Jun. 11, 2007.

Green, "PM's Thermostat Guide," Popular Mechanics, pp. 155-158, Oct. 1985.

Gupta et al., "Adding GPS-Control to Traditional Thermostats: An Exploration of Potential Energy Savings and Design Challenges," Pervasive, LNCS 5538, pp. 95-114, 2009.

Gupta, "A Persuasive GPS-Controlled Thermostat System," 89 pages, Sep. 2008.

http://community.lockitron.com/notifications-geofencing-scheduling-sense-bluetooth/633, "Lockitron Community, Notifications, Geofencing, Scheduling, Sense/Bluetooth," 14 pages, printed Oct. 29, 2014.

http://stackoverflow.com/questions/14232712/tracking-multiple-20-locations-with-ios-geofencing, "Tracking Multiple (20+) Locations with iOS Geofencing—Stack Overflow," 2 pages, printed Oct. 29, 2014.

http://www.allure-energy.com/aenf_jan9_12.html, "CES Gets First Look at EverSense," Allure Energy, 2 pages, printed Feb. 17, 2015.

http:IWww.prnev.tswire.com/nev.ts-releases/allure-energy-unveils-a-combination-of-ibeacon-and-nfc-enabled-smart-sensor-technology-known-as-aura-23885 . . . , "Allure Energy Unveils a Combination of iBeacon and NFC Enabled Smart Sensor Technology Known Aura," 6 pages, Jan. 6, 2014.

Mobile Integrated Solutions, LLC, "MobiLinc Take Control of Your Home, MobiLinc and Geo-Fence Awareness," 9 pages, downloaded Mar. 27, 2015.

Pan et al., "A Framework for Smart Location-Based Automated Energy Controls in a Green Building Testbed," 6 pages, downloaded Jan. 30, 2015.

SmartThings Inc., "2 Ecobee Si Thermostat + Geofencing," 17 pages, downloaded Nov. 3, 2014.

U.S. Appl. No. 15/048,902, filed Feb. 19, 2016.

Extended European Search Report and Opinion for EP Application No. 16156760.7-1862, dated Jul. 8, 2016.

U.S. Appl. No. 14/668,800, filed Mar. 25, 2015.

U.S. Appl. No. 14/696,662, filed Apr. 27, 2015.

U.S. Appl. No. 14/696,725, filed Apr. 27, 2015.

U.S. Appl. No. 14/933,948, filed Nov. 5, 2015.

U.S. Appl. No. 14/934,543, filed Nov. 6, 2015.

U.S. Appl. No. 14/938,595, filed Nov. 11, 2015.

U.S. Appl. No. 14/938,642, filed Nov. 11, 2015.

U.S. Appl. No. 14/964,264, filed Dec. 9, 2015.

U.S. Appl. No. 14/964,349, filed Dec. 9, 2015.

Scanlon et al., "Mutual Information Based Visual Feature Selection for Lipreading," 8th International Conference on Spoken Language Processing, 5 pages, Oct. 4-8, 2004.

Transportation Research Board of the National Academies, Commuting in America III, the Third National Report on Commuting Patterns and Trends, 199 pages, 2006.

Allure Energy, "Our Technology," http://www.allure-energy.com/pages/about.jsp 1 page, printed May 30, 2012.

Extended European Search Report for EP Application No. 16195639.6, dated May 31, 2017.

International Search Report for PCT Application No. PCT/US2010/042589 dated Nov. 22, 2010.

Mozer, "The Neural Network House: An Environment that Adapts to Its Inhabitants," Department of Computer Science, University of Colorado, 5 pages, downloaded May 29, 2012.

Extended European Search Report for EP Application No. 1619416, dated Feb. 2, 2017.

Extended European Search Report for EP Application No. 16196128.9, dated Mar. 7, 2017.

Gentec, "Feature Focus, Threat Level Management," 2 pages, 2013.

* cited by examiner

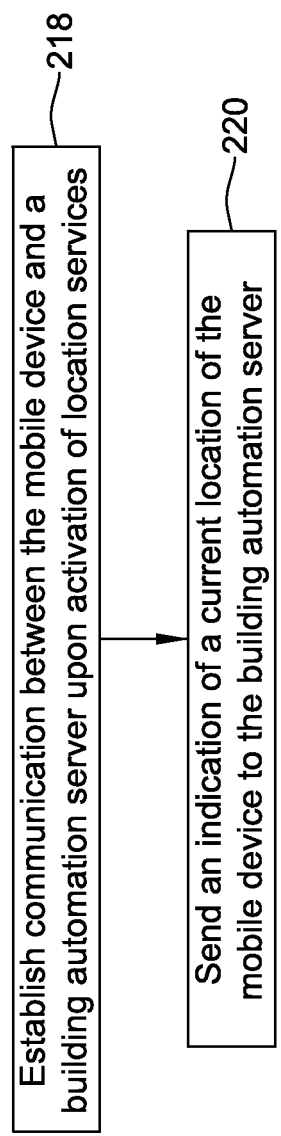

MULTI-USER GEOFENCING FOR BUILDING AUTOMATION

TECHNICAL FIELD

The disclosure relates generally to building automation, and more particularly to building automation systems with geofencing capabilities.

BACKGROUND

Building automation systems are often used to control safety, security and/or comfort levels within a building or other structure. Illustrative but non-limiting examples of building automation systems include Heating, Ventilation and/or Air Conditioning (HVAC) systems, security systems, lighting systems, fire suppression systems and/or the like. In some cases, a building automation system may enter an unoccupied mode when the building is expected to be unoccupied and an occupied mode when the building is expected to be occupied. When the building automation system includes an HVAC system, the building automation system may set a temperature setpoint of the HVAC system to a more energy efficient setting when in an unoccupied mode and a more comfortable setting when in an occupied mode. When the building automation system includes a security system, the building automation system may set the security system to an away state when in an unoccupied mode and an unlocked or home state when in an occupied mode. In some cases, geofencing may be used to help determine if the building is occupied or unoccupied, and the building automation system may operate accordingly.

SUMMARY

This disclosure relates generally to multi-user geofencing capabilities of a building automation system. An example of the disclosure may be found in a building automation server that includes a memory, a communication interface and a controller that is coupled to the memory and the communication interface. In some cases, the memory may store a database that includes a plurality of user accounts. Each user account may correspond to a corresponding building, and may specify a building location for the corresponding building, a geofence defined relative to the building location, and one or more group member ID's. Each of the group member ID's may be associated with a corresponding mobile device that has location services, and each user account may identify a geofence status for each of the one or more group member ID's. The geofence status may indicate whether the corresponding mobile device for each of the one or more group member ID is within the geofence associated with the user account or outside of the geofence.

In some cases, the controller of the building automation server may be configured to receive, via the communication interface, geofence crossing notifications issued by the mobile devices that correspond to the one or more group member ID's as those mobile devices cross the geofence that is associated with the corresponding user account. In some cases, the location service of a mobile device initiates communication between the mobile device and the building automation server when the location service indicates that the mobile device has crossed the geofence. In response, the controller of the building automation server may update the geofence status for each of one or more group member ID's in the memory using the geofence crossing notifications. The controller may be configured to recognize when the geofence status of all of the one or more group member ID's of a user account are outside of the corresponding geofence(s), and may interpret this condition as the corresponding building being unoccupied. The controller may further recognize when the geofence status of one or more of the group member ID's of a user account are inside of the corresponding geofence(s), and may interpret this condition as the corresponding building being occupied or soon to be occupied.

In some cases, the controller may notify a building controller of the building associated with the user account that the building has become unoccupied or occupied. The building controller may then control the building accordingly.

BRIEF DESCRIPTION OF THE FIGURES

FIG. 10 is a flow diagram showing another illustrative method;

Figure 1:
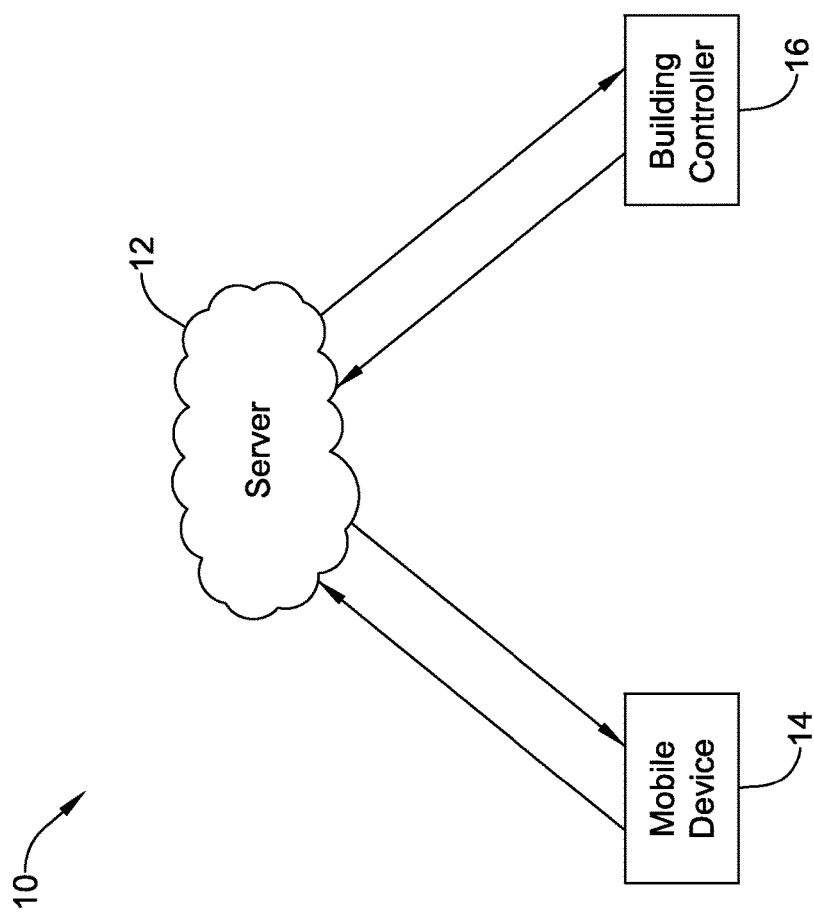
FIG. 1 is a schematic view of an illustrative building automation system.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

The present disclosure is directed generally at building automation system. Building automation systems are systems that control one or more operations of a building. Building automation systems can include HVAC systems, security systems, fire suppression systems, energy management systems and/or any other suitable systems. While HVAC systems are used as an example below, it should be recognized that the concepts disclosed herein can be applied to building control systems more generally.

In its broadest interpretation, a building automation system includes a controller, computer and/or other processing equipment that is configured to control one or more features, functions, systems or sub-systems of a building. In some cases, devices that can be used by individuals to communicate with the controller, computer and/or other processing equipment. In some cases, a building automation system may include a plurality of components that, in combination, perform or otherwise provide the functionality of the building automation system. A building automation system may be fully contained within a single building, or may include components that are spread between multiple housings and/or across multiple locations. In some embodiments, a building automation system, regardless of the physical location(s) of the components within the building automation system, may control one or more building systems within a single building. In some cases, a building automation system, regardless of the physical location(s) of the components within the building automation system, may control one or more building systems within a plurality of buildings, optionally in accordance with a common operating procedure and/or distinct operating procedures for each building as desired.

FIG. 1 is a schematic illustration of an illustrative building automation system 10. The illustrative building automation system 10 includes a server 12 that may be configured to communicate with a mobile device 14 and with a building controller 16. It will be appreciated that for simplicity, only a single mobile device 14 is shown, while in many cases the server 12 may be configured to communicate directly or indirectly with any number of mobile devices 14. Similarly, while a single building controller 16 is illustrated, in many cases the server 12 may be configured to communicate directly or indirectly with any number of building controllers 16, located in a single building or distributed throughout a plurality of buildings. The server 12 is illustrated as a single, cloud-based server. In some cases, the server 12 may be a single server. In some instances, the server 12 may generically represent two, three or more servers commonly located or spread between two or more physical locations. In some cases, the server 12 handles communication with both the mobile device 14 and the building controller 16. In some instances, as shown for example in FIG. 2, distinct servers may carry out each communications protocol if desired.

In some cases, the mobile devices 14 may communicate with the server 12 at least partially through a network such as the Internet, sometimes using a cell phone network, WiFi network other any other suitable network. Likewise, it is contemplated that the building controller 16 may communicate with the server 12 at least partially through a network such as the Internet, sometimes using a cell phone network, WiFi network other any other suitable network.

Figure 2:
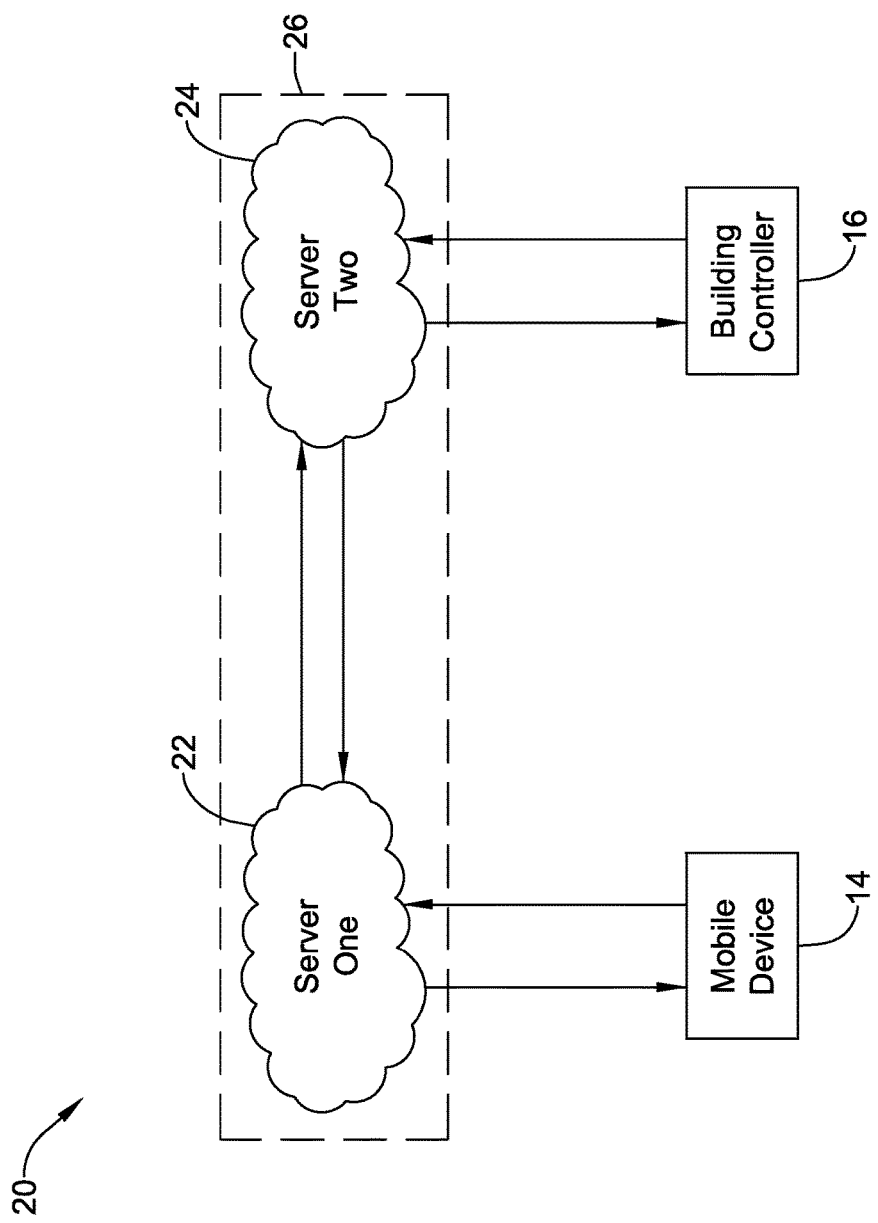
FIG. 2 is a schematic view of another illustrative building automation system.

FIG. 2 is a schematic illustration of another illustrative building automation system 20. The illustrative building automation system 20 includes a first server 22 that may be configured to communicate with a mobile device 14 (or multiple mobile devices 14) and a second server 24 that may be configured to communicate with a building controller 16 (or multiple building controllers 16). The first server 22 may be configured to receive data from the mobile device 14, process the data, and send data to the mobile device 14 and/or to the second server 24. The second server 24 may be configured to receive data from the building controller 16, process the data, and send data to the building controller 16 and/or to the first server 22. In some instances, the first server 22 may be configured to permit data from the mobile device 14 to pass directly through to the building controller 16. In some cases, the second server 24 may be configured to permit data from the building controller 16 to pass directly through to the mobile device 14. The first server 22 and the second server 24 may be configured to communicate with each other.

It will be appreciated that for simplicity, only a single mobile device 14 is shown, while in many cases the first server 22 may be configured to communicate directly or indirectly with any number of mobile devices 14. Similarly, while a single building controller 16 is illustrated, in many cases the second server 24 may be configured to communicate directly or indirectly with any number of building controllers 16, located in a single building or distributed throughout a plurality of buildings.

The first server 22 is illustrated as a single, cloud-based server. In some cases, the first server 22 may be a single server. In some instances, the first server 22 may generically represent two, three or more servers commonly located or spread between two or more physical locations. The second server 24 is illustrated as a single, cloud-based server. In some cases, the second server 24 may be a single server. In some instances, the second server 24 may generically represent two, three or more servers commonly located or spread between two or more physical locations. In some cases, the first server 22 and the second server 24 may, in combination, be considered as representing or forming a building automation server 26.

Figure 3:
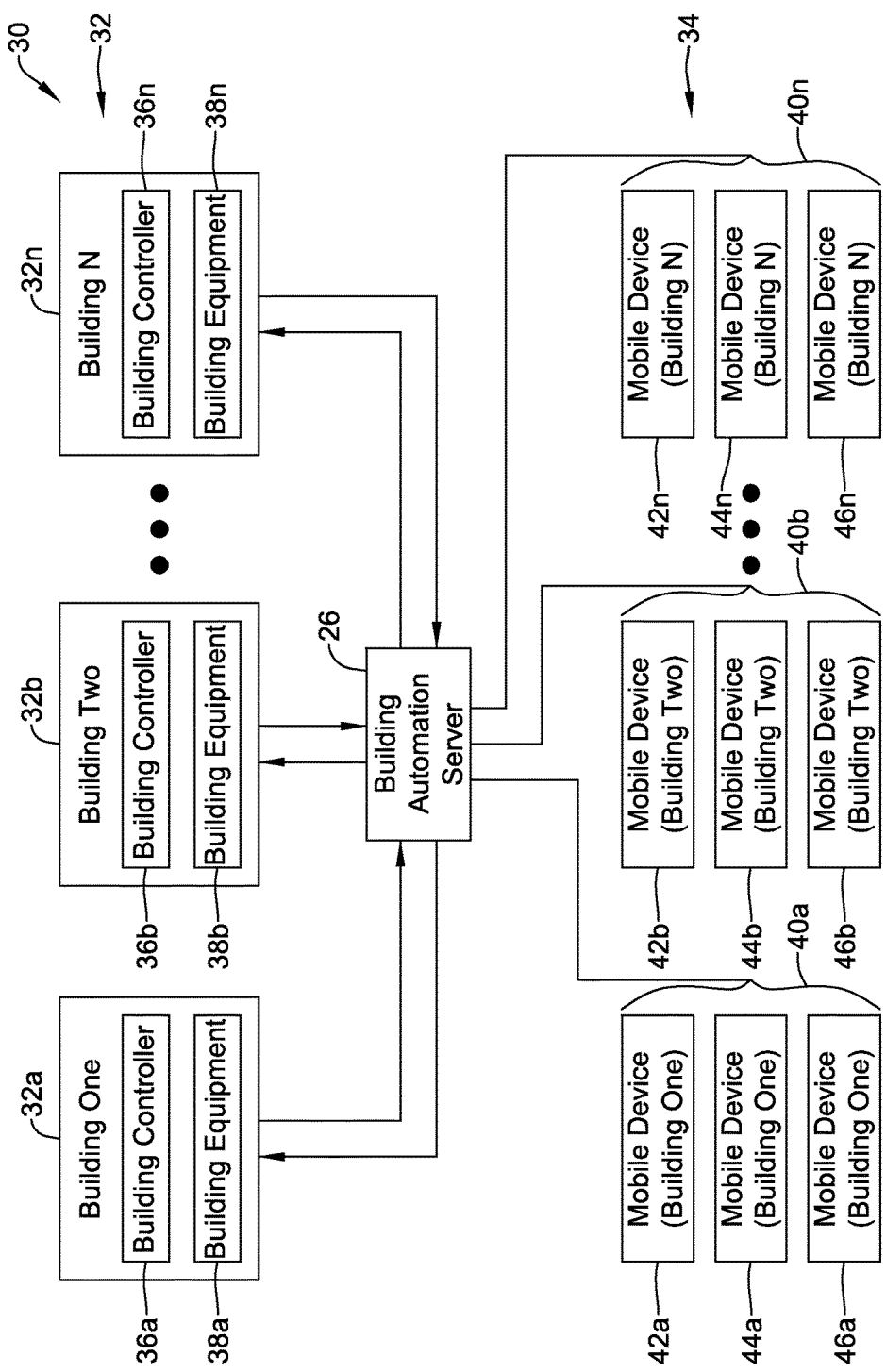
FIG. 3 is a schematic view of another illustrative building automation system.

FIG. 3 is a schematic illustration of a building automation system 30 in which a building automation server 26 is configured to communicate with a plurality of buildings 32 as well as a plurality of mobile devices 34. It is contemplated that the building automation server 26 may include a single server or two or more distinct servers at one or several locations. The building automation system 30 may serve any desired number of buildings. As illustrated, the plurality of buildings 32 includes a Building One, labeled as 32A, a Building Two, labeled as 32B, and so on through a Building "N", labeled as 32N. It will be appreciated that the building automation system 30 may include a large number of buildings, each in communication with a central (or distributed) building automation server 26.

As illustrated, each of the plurality of buildings 32 includes a building controller and one or more pieces of building equipment. The building equipment may, for example, be HVAC equipment, security equipment, lighting equipment, fire suppression equipment, and the like. In particular, the building 32A includes a building controller 36A and a building equipment 38A, the building 32B includes a building controller 36B and a building equipment 38B, and so on through the building 32N, which includes a building controller 36N and a building equipment 38N. It will be appreciated that while each building is illustrated as having a single building controller and a single building equipment controlled by the single building controller, in some cases a building may have multiple related or unrelated building controllers and/or multiple pieces of related or unrelated building equipment.

The plurality of mobile devices 34 may be considered as being divided into a set of mobile devices 40A that can be associated with the building 32A, a set of mobile devices 40B that can be associated with the building 32B, and so on through a set of mobile devices 40N that can be associated with the building 32N. As illustrated, the set of mobile devices 40A includes a first mobile device 42A, a second mobile device 44A and a third mobile device 46A. The set of mobile devices 40B includes a first mobile device 42B, a second mobile device 44B and a third mobile device 46B and so on through the set of mobile devices 40N, which includes a first mobile device 42N, a second mobile device 44N and a third mobile device 46N. This is merely illustrative, as any number of mobile devices such as smartphones or tablets, may be associated with a particular building, as desired. Each user or occupant of a building may have one associated mobile device, or may have several associated mobile devices.

Associating a mobile device with a building generally involves the individual who uses the particular mobile device. A mobile device can communicate with the building, through the building automation server 26, to provide instructions to the building controller and/or to receive information from the building controller. In some instances, a mobile phone with location services activated can be used to inform the building controller as to the whereabouts of the user relative to the building, and in some cases how long before they will arrive at the building. In response, the building controller can operate the building equipment in an energy savings manner when all users associated with the building are determined to be away from the building (e.g. the building is unoccupied). For example, if the building controller is an HVAC controller, and is informed that nobody is home or is expected home soon, the HVAC controller can operate the HVAC equipment at a lower temperature setpoint in the winter, or at a higher temperature setpoint in the summer in order to save energy.

In some embodiments, there may be a desire to instruct the building controller to operate manually, at least for a period of time. While operating manually, the building controller may operate one or more building systems to maintain a particular temperature set point or schedule, a lighting mode, a security system mode, and the like. While operating manually, the building controller may ignore any geofence events that it is informed of. In some instances, the building automation server may keep track of geofence events that occur during a period of manual operation resulting from an individual triggering a suspend mode, using either the building controller or their mobile device. While geofence events may not be transmitted to the building controller, or may be transmitted to the building controller but ignored by the building controller, the building automation server may still use those triggers to update the status of each assigned user.

Figure 4:
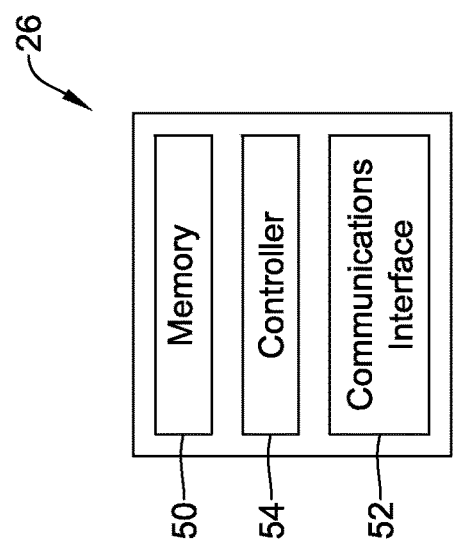
FIG. 4 is a schematic view of an illustrative building automation server.

FIG. 4 is a schematic view of an illustrative building automation server, such as building automation server 26 of FIG. 3. In broadest terms, the building automation server 26 may include a memory 50, a communications interface 52 and a controller 54 that is coupled to the memory 50 and the communications interface 52. As will be illustrated in greater detail in FIG. 5, the memory 50 may be configured to store, for example, a database that includes a plurality of user accounts, wherein each user account includes an associated building location of a building, an associated geofence defined relative to the building location, and one or more group member ID's. Each of the one or more group member ID's may be associated with a corresponding mobile device with location services, and each user account may identify a geofence status for each of the one or more group member ID's. The geofence status may indicate whether the corresponding mobile device for each of the one or more group member ID is within the geofence associated with the user account or outside of the geofence. In some cases, more than one geofence may be provided. In one example, each user may have a different defined geofence. In another example, a building may have a first geofence that is used to detect outbound crossings, and a second geofence that is used to detect inbound crossings. In yet another example, a first geofence or set of geofences may be defined for weekdays, and a second geofence or set of geofences may be defined for weekend days.

In the example shown, the controller 54 of the building automation server 26 is configured to receive, via the communications interface 52, geofence crossing notifications that are issued by the mobile devices that correspond to the one or more group member ID's as those mobile devices cross the geofence(s) that is/are associated with the corresponding user account. In some cases, the controller 54 may receive the geofence status of each associated mobile device. For example, if a person with a mobile device associated with the building 32A crosses a geofence associated with the building 32A, the controller 54 may be configured to receive a geofence crossing notification from that person's mobile device. In some cases, the controller 54 may be further configured to update the geofence status for each of one or more group member ID's in the memory using the geofence crossing notifications.

In some instances, the controller 54 may be configured to recognize when the geofence status of all of the one or more group member ID's of a user account are outside of the geofence(s) that is/are associated with the user account, and interprets the building, such as the building 32A, the building 32B, and so on, that is associated with the user account as being unoccupied. The controller 54 may also be configured to recognize when the geofence status of at least one of the one or more group member ID's of the user account is inside of the geofence that is associated with the user account, and interprets the building that is associated with the user account as being occupied or soon be occupied. The controller 54 may be configured to notify the building controller(s) of the building that is associated with the user account that the building has become unoccupied when the controller 54 interprets the building as being unoccupied. The controller 54 may also be configured to notify the building controller that the building has become occupied or will soon to be occupied when the controller 54 interprets the building as being occupied or soon to be occupied. The building controller may receive these notifications and operate accordingly.

Figure 5:
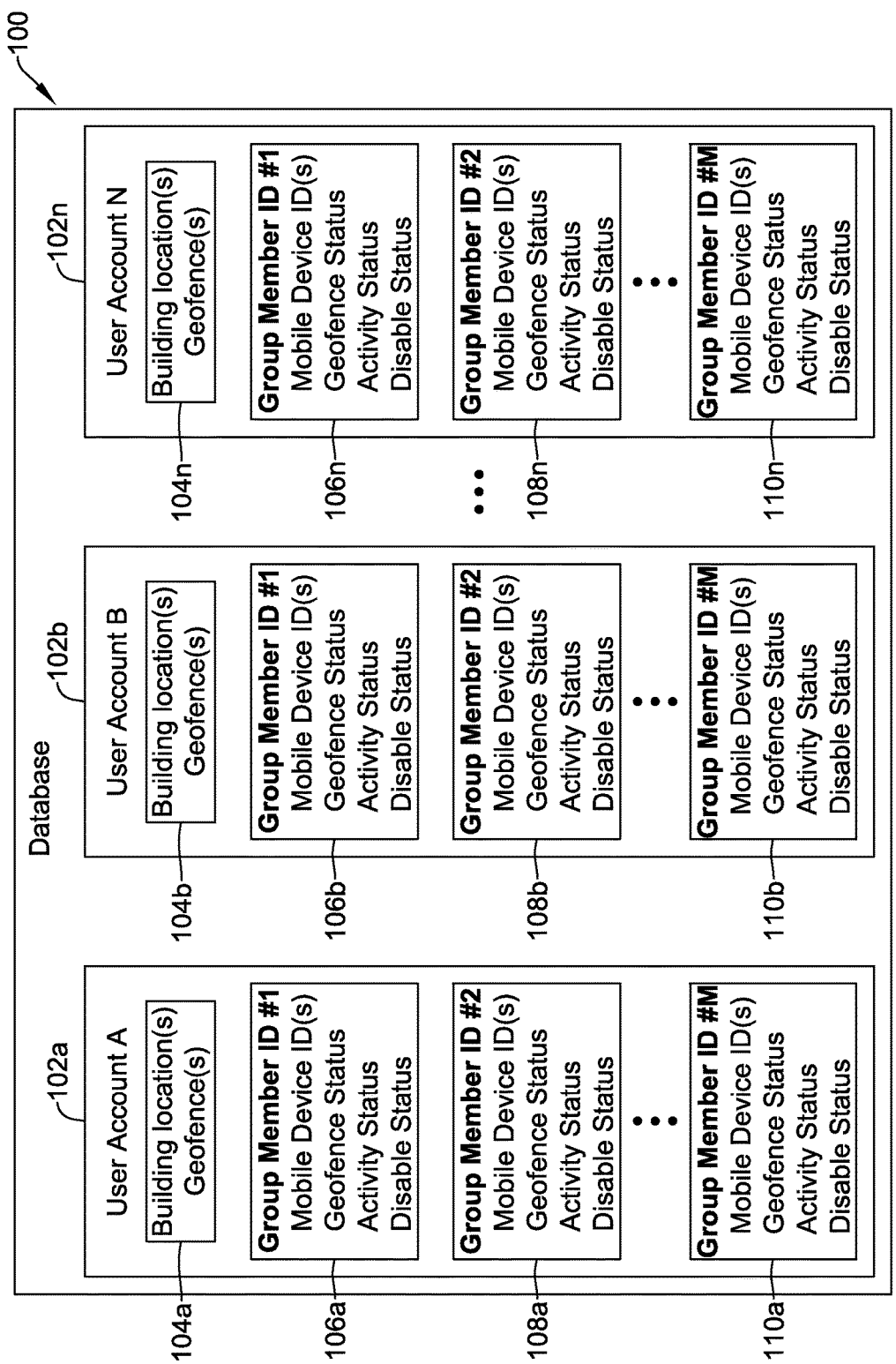
FIG. 5 is a schematic view of an illustrative database storable within the memory of the illustrative building automation server of FIG. 4.

FIG. 5 is a schematic view of a database 100 that may be stored in the memory 50 of the illustrative building automation server 26. In some cases, the database 100 may store relevant information for a large number of user accounts. As illustrated, the database 100 includes a User Account A, labeled as 102A, a User Account B, labeled as 102B, and so on through a User Account N, labeled as 102N. It will be appreciated that there may be several user accounts, several tens of user accounts, several hundreds, several thousand, several million or more user accounts stored within the database 100. For each user account, the database 100 may store location information pertaining to that particular user account. For example, the user account 102A includes a locations block 104A that includes building location(s) and geofence location(s) information pertaining to the user account 102A. Similarly, the user account 102B includes a locations block 104B that includes building location(s) and geofence location(s) information pertaining to the user account 102B, and so on through the user account 102N, which includes a locations block 104N including building location(s) and geofence location(s) information pertaining to the user account 102N.

Each user account may also store a number of data entries for each of the group members that are associated with that user account. For example, the user account 102A may include a block 106A devoted to the group member ID #1, a block 108A devoted to the group member ID #2, and so on through a block 110A devoted to the group member ID #M. The block 106A may include any variety of information pertaining to the group member ID #1, including but not limited to, mobile device(s) ID(s) for group member ID #1, current and/or historical geofence status of group member ID #1, current and/or historical activity status of group member ID #1, disable/enable status of group member ID #1, and/or any other suitable information. Likewise, block 108A may include any variety of information pertaining to the group member ID #2, including but not limited to, mobile device(s) ID(s) for group member ID #2, current and/or historical geofence status of group member ID #2, current and/or historical activity status of group member ID #2, disable/enable status of group member ID #2, and/or any other suitable information. Similarly, block 110A may include any variety of information pertaining to the group member ID #M, including but not limited, mobile device(s) ID(s) for group member ID #M, current and/or historical geofence status of group member ID #M, current and/or historical activity status of group member ID #M, disable/enable status of group member ID #M, and/or any other suitable information.

In the example shown, the user account 102B includes a block 106B devoted to the group member ID #1 of ID account 102B, a block 108B devoted to the group member ID #2, and so on through a block 110B devoted to the group member ID #M. The block 106B may include any variety of information pertaining to the group member ID #1, including but not limited to, mobile device(s) ID(s) for group member ID #1, current and/or historical geofence status of group member ID #1, current and/or historical activity status of group member ID #1, disable/enable status of group member ID #1, and/or any other suitable information. Likewise, block 108B may include any variety of information pertaining to the group member ID #2, including but not limited to, mobile device(s) ID(s) for group member ID #2, current and/or historical geofence status of group member ID #2, current and/or historical activity status of group member ID #2, disable/enable status of group member ID #2, and/or any other suitable information. Similarly, block 110B may include any variety of information pertaining to the group member ID #M, including but not limited, mobile device(s) ID(s) for group member ID #M, current and/or historical geofence status of group member ID #M, current and/or historical activity status of group member ID #M, disable/enable status of group member ID #M, and/or any other suitable information.

The user account 102N includes a block 106N devoted to the group member ID #1 of user account 102N, a block 108N devoted to the group member ID #2, and so on through a block 110N devoted to the group member ID #M. The block 106N may include any variety of information pertaining to the group member ID #1, including but not limited to, mobile device(s) ID(s) for group member ID #1, current and/or historical geofence status of group member ID #1, current and/or historical activity status of group member ID #1, disable/enable status of group member ID #1, and/or any other suitable information. Likewise, block 108N may include any variety of information pertaining to the group member ID #2, including but not limited to, mobile device(s) ID(s) for group member ID #2, current and/or historical geofence status of group member ID #2, current and/or historical activity status of group member ID #2, disable/enable status of group member ID #2, and/or any other suitable information. Similarly, block 110N may include any variety of information pertaining to the group member ID #M, including but not limited, mobile device(s) ID(s) for group member ID #M, current and/or historical geofence status of group member ID #M, current and/or historical activity status of group member ID #M, disable/enable status of group member ID #M, and/or any other suitable information.

It will be appreciated that by virtue of the information maintained in the database 100, the controller 54 may have the ability to keep track of geofencing information for a large number of individuals who are each assigned to one of a potentially large number of different buildings (e.g. different homes).

In some embodiments, the controller 54 of the illustrative building automation server 26 may be configured to receive a request from one or more group member ID's of a user account to assign a disable status to one or more of the group member ID's of the corresponding user account. If a particular group member ID has a disable status, the controller 54 may be configured to not consider the geofence status of those group member ID's that have the disabled status when determining whether the corresponding building is occupied or not occupied. For example, if a particular user ID has a disable status, the controller 54 may decide that the building is unoccupied, even if that user ID is indicate as being in the building. In some cases, the controller 54 may be configured to receive a request from a first group member ID to assign a disable status to the first group member ID. In some instances, the controller 54 may be configured to receive a request from a first group member ID of a first user account to assign a disable status to a second group member ID of the first user account. In some cases, an application program running on the mobile device may facilitate a user to change his/her disable status, or the disable status of another group member ID within the same user account. In some cases, one of the group member ID's may have administrator privileges that permit that group member to add or change information and/or settings associated with the corresponding user account. This can include changing the disable status of the group members of the user account.

In some embodiments, the controller 54 may be configured to track an activity status of each of the one or more group member ID's, wherein the activity status may include an active status and an inactive status. If the activity status of a particular group member ID is active, the controller 54 may be configured to update the geofence status for that group member ID in the memory using geofence crossing notifications issued by the mobile device that corresponds to that group member ID. If the activity status of a group member ID is inactive, the controller 54 may be configured to not update the geofence status for that group member ID in the memory using geofence crossing notifications issued by the mobile device that corresponds to that group member ID. In some cases, the controller 54 may be configured to automatically assign the inactive status to a group member ID if no geofence crossing notification from the mobile device that corresponds to that group member ID is detected over a predetermined length of time. The predetermined length of time may be of any duration, although in some cases the predetermined length of time may be one day, three days, seven days or some other time period. In some instances, the controller 54 may be configured to automatically assign an active status to a group member ID that has an inactive status if a geofence crossing notification issued by the mobile device that corresponds to that group member ID is detected.

In some cases, a particular individual may own or use more than one mobile device. In some instances, the controller 54 may be configured to associate more than one mobile device to a group member ID. If more than one mobile device associated with a group member ID has location services activated, the controller 54 may be configured to use the last received geofence crossing notification when identifying the geofence status for that group member ID. In some instances, an individual may have both a smartphone and a tablet. While the tablet may be used for accessing features and functionality of a building controller by running an application on the tablet, the controller 54 may be configured to recognize geofence crossing notifications issued by the smart phone but not recognize geofence crossing notifications issued by the tablet. The controller 54 may be configured to accept set point changes via the smartphone and the tablet.

In some instances, an individual may cross a geofence with their mobile device turned off, in airplane mode or otherwise temporarily out of communication with the controller 54. In other instances, a user may accidently turn off location services, even if the mobile device is still powered. In some cases, if a mobile device that corresponds to a group member ID does not have location services available (e.g. turned off or the mobile device is off or otherwise out of communication) when crossing a geofence associated with the corresponding user account, but the location services of the mobile device subsequently become available later, the controller 54 may be configured to receive a current position of the mobile device relative to the geofence and update the geofence status for that group member ID according to the current position of the mobile device.

As eluded to above, the controller 54 may be configured to grant administrator privileges to one or more of the group member ID's for each of the plurality of user accounts, and wherein the group member ID(s) that has the administrator privileges may have additional rights relative to group member ID(s) that do not have the administrator privileges. While not shown in the database 100 as illustrated in FIG. 5, the database 100 may also store information pertaining to whether a particular group member ID has administrator privileges. For example, an individual with administrator privileges may be enabled to make changes to how the building equipment functions, while an individual without administrator privileges may only be enabled to make minor set point changes. In some cases, one or several adults in a building or home may have administrator privileges, while others in the home, such as juvenile children, may not have administrator privileges.

In some cases, a new group member may be invited to join a user account. An existing member of a user account (e.g. ADMIN) may send an invitation to one or more individuals to join the user account. This invitation can be delivered in any suitable form, such as by SMS message and/or email. The individual receiving the invitation may need to download an application program to their mobile device and register their mobile device with the system before being accepted as a new group member of the user account. In some cases, the new group member may be asked if they want geo-location services to be enabled on their mobile device. Without allowing their location services to be enabled, the system will assigned a disable status to their group member ID, and will not consider their geo-location when determining whether the corresponding building is occupied or not occupied. In some cases, once a new group member is registered with the user account, the location of the corresponding building, geofence information, as well as other information may be delivered and registered with the location service of the new group member's mobile device.

In some instances, the controller 54 may be configured to grant a USER status to one or more of the group member ID's and optionally assign a GUEST status to one or more of the group member ID's, wherein the group member ID(s) that have been assigned the GUEST status have less rights relative to group member ID(s) that have been assigned the USER status or administrator privileges. While not shown in the database 100 as illustrated in FIG. 5, the database 100 may also store information pertaining to whether a particular group member ID has USER status or GUEST status. In an illustrative but non-limiting example, individuals who live in a home may be assigned USER status, and thus have particular rights and permissions. Individuals who do not live in the home, but are temporarily in the home, may be granted GUEST status and thus may have reduced rights and permissions, although their presence or absence, relative to a geofence, may be detected and used. For example, temporary house guests may be granted GUEST status. A neighbor watching a vacant house for their neighbor may be granted GUEST status. House cleaners may be granted GUEST status.

Mobile devices typically have several different location services available to them. In some cases, a mobile device may use GPS functionality for determining its location. In some cases, a mobile device may triangulate its position using cell signal strength. In some instances, a mobile device may utilize short range communications such as WiFi to triangulate its position. In some embodiments, the controller 54 may generally rely upon location information provided by a less accurate but less power-hungry location service such as cell signal strength. While the building automation server 26 may not necessarily instruct the mobile device as to which method(s) to use for location services, in some cases the building automation server 26 may ask the mobile device for its location, in combination with a desired accuracy level. A low accuracy level request may cause the mobile device to rely on cell signal strength or other lower power option. Conversely, a high accuracy level request may cause the mobile device to rely on a more accurate but more power-hungry location service such as GPS. In some cases, the controller 54 may be configured to send one of the mobile devices a request to temporarily turn on GPS functionality within the mobile device and to return a GPS location to the controller.

In some instances, the controller 54 may be configured to receive an indication from one or more of the mobile devices of a current location of the mobile device not in response to the mobile device crossing the geofence that is associated with the corresponding user account. For example, the controller 54 may periodically ask a mobile device to confirm its location. In some instances, the mobile device itself may be instructed to periodically broadcast its location. In some cases, the mobile device may be instructed to periodically check its location, and only broadcast its location if the detected location does not agree with where the mobile device believed itself to be, particularly with respect to its location (inside or outside) relative to a particular geofence.

FIGS. 6 through 10 provide illustrative but non-limiting examples of methods that may be carried out by the building automation systems described herein. In some cases, these methods may be manifested in a non-transitory computer-readable storage medium including an executable program stored on the storage medium. The executable program may instruct a mobile device having location services to carry out various methods. While described in distinct Figures, it will be appreciated that the methods shown in FIG. 6 through FIG. 10 may be combinable in any desired way.

Figure 6:
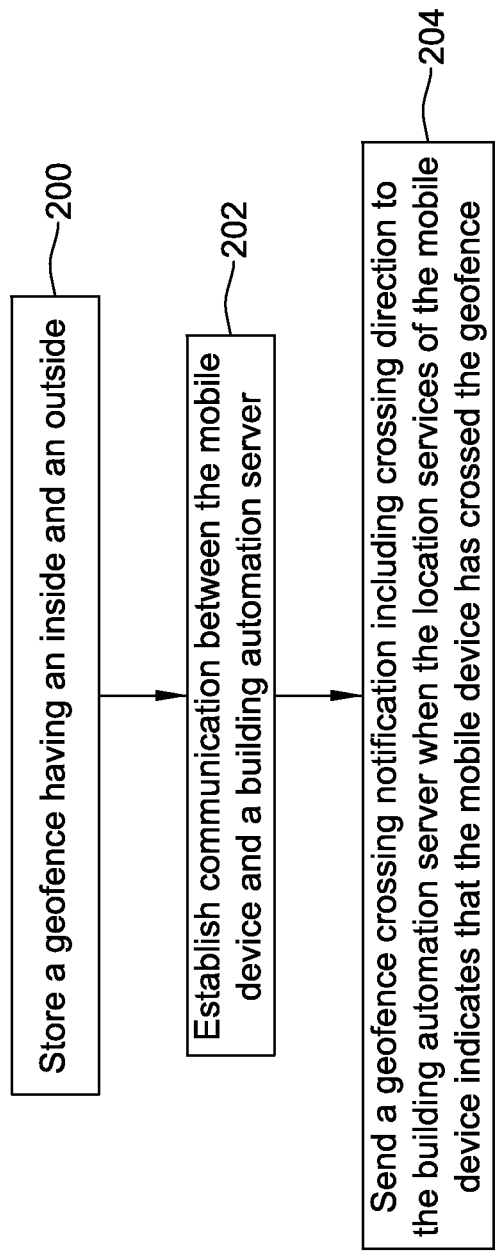
FIG. 6 is a flow diagram showing an illustrative method.

FIG. 6 shows an illustrative a method that begins with storing a geofence that has an inside and an outside, as generally indicated at block 200. This geofence may be stored in the mobile device. As seen at block 202, communication between the mobile device and a building automation server (such as the building automation server 26) may be established. A geofence crossing notification may be sent to the building automation server when the location services of the mobile device indicates that the mobile device has crossed the geofence, as generally indicated at block 204. The notification may include whether the crossing was from the inside of the geofence to the outside or from the outside of the geofence to the inside. In some cases, the geofence may include a first geofence used to detect an outbound crossing and a second geofence to detect in inbound crossing. In some cases, the location services of the mobile device may initiate the executable program to establish communication between the mobile device and a building automation server when the location services indicates that the mobile device has crossed the geofence.

Figure 7:
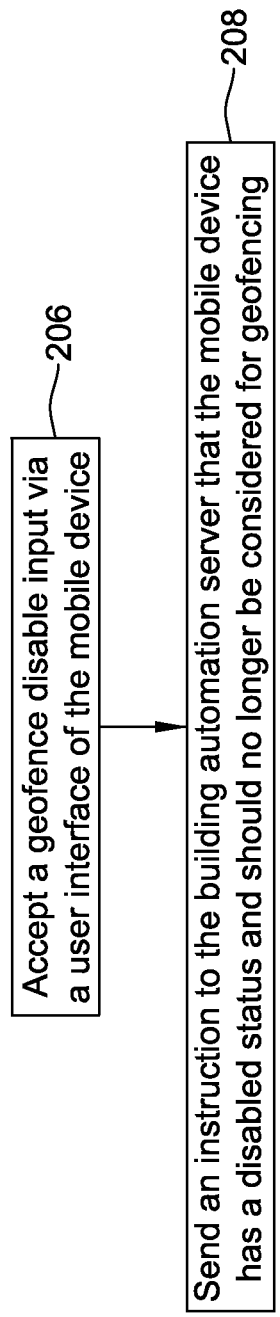
FIG. 7 is a flow diagram showing another illustrative method.

FIG. 7 describes a method that begins with accepting a geofence disable input via a user interface of the mobile device, as generally seen at block 206. In response to accepting the geofence disable input, the mobile device may send an instruction to the building automation server that the mobile device has a disabled status and should no longer be considered for geofencing, as generally seen at block 208.

Figure 8:
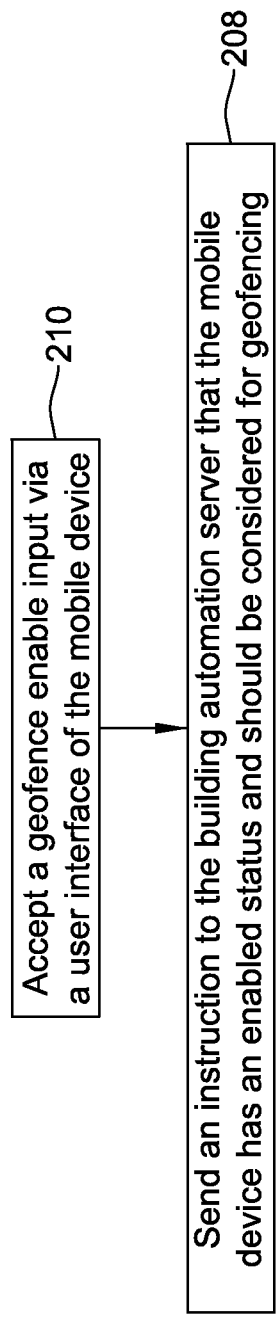
FIG. 8 is a flow diagram showing another illustrative method.

FIG. 8 describes a method that begins with the mobile device accepting a geofence enable input via a user interface of the mobile device, as generally seen at block 210. In response to accepting the geofence enable input, and as shown at block 212, the mobile device may send an instruction to the building automation server that the mobile device has an enabled status and should be considered for geofencing.

Figure 9:
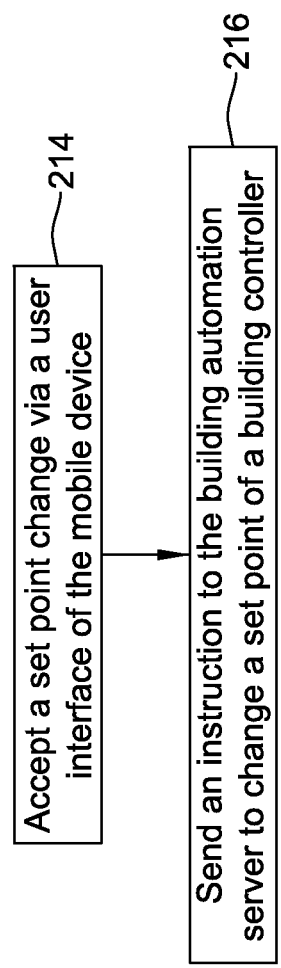
FIG. 9 is a flow diagram showing another illustrative method.

FIG. 9 describes a method that begins with the mobile device accepting a set point change via a user interface of the mobile device, as generally indicated at block 214. The set point change can be an HVAC temperature set point, a lighting timing set point, or the like. In response to accepting the set point change, and as shown at block 216, the mobile device may send an instruction to the building automation server to change a set point of a building controller.

FIG. 10 describes a method that begins with establishing communication between the mobile device and a building automation server upon activation of the location services of the mobile device, as generally shown at block 218. Once communication has been established, the mobile device may send an indication of a current location of the mobile device to the building automation server as generally shown at block 220. In some instances, whenever location services is activated on a mobile device, the mobile device may send an indication of a current location of the mobile device to the building automation server.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

I claim:

1. A building automation server comprising:
a memory for storing a database comprising a plurality of user accounts each corresponding to a different building, wherein each user account includes an associated building location of the corresponding building, an associated geofence defined relative to the building location, and a plurality of group member ID's, wherein each of the plurality of group member ID's is associated with a corresponding mobile device with location services, and each user account identifies a geofence status for each of the plurality of group member ID's, where the geofence status indicates whether the corresponding mobile device for each of the plurality of group member ID is within the geofence associated with the user account or outside of the geofence;
a communication interface;
a controller coupled to the memory and the communication interface, the controller configured to receive via the communication interface geofence crossing notifications issued by the mobile devices that correspond to the plurality of group member ID's as those mobile devices cross the geofence that is associated with the user account;
the controller is further configured to update the geofence status for each of the plurality of group member ID's in the memory using the geofence crossing notifications;
the controller is further configured to recognize when the geofence status of all of the plurality of group member ID's of a user account are outside of the geofence that is associated with the user account, and interprets the building that is associated with the user account as being unoccupied, and recognize when the geofence status of at least one of the plurality of group member ID's of the user account is inside of the geofence that is associated with the user account, and interprets the building that is associated with the user account as occupied or soon be occupied;
the controller is further configured notify a building controller of the building associated with the user account via the communication interface that the building has become unoccupied when the controller interprets the building that is associated with the user account as being unoccupied, wherein in response, the building controller is configured to change at least one building control parameter to an unoccupied setting, and control the building associated with the user account in accordance with the unoccupied setting; and the controller is further configured to notify the building controller of the building associated with the user account via the communication interface that the building has become occupied or will soon to be occupied when the controller interprets the building that is associated with the user account as being occupied or soon to be occupied, wherein in response, the building controller is configured to change at least one building control parameter to an occupied setting, and control the building associated with the user account in accordance with the occupied setting.

2. The building automation server of claim 1, wherein the controller is further configured to receive a request from one or more mobile devices of one or more group member ID's of a user account to assign a disable status to one or more group member ID's of the corresponding user account, wherein the controller is configured to not consider the geofence status of group member ID's that have the disabled status when determining whether the corresponding building is occupied or not occupied.

3. The building automation server of claim 2, wherein the controller is configured to receive a request from a first group member ID to assign a disable status to the first group member ID.

4. The building automation server of claim 2, wherein the controller is configured to receive a request from a first group member ID of a first user account to assign a disable status to a second group member ID of the first user account.

5. The building automation server of claim 1, wherein the controller is further configured to track an activity status of each of the plurality of group member ID's, wherein the activity status includes an active status and an inactive status, and wherein:
  if the activity status of a group member ID is active, the controller is configured to update the geofence status for that group member ID in the memory using geofence crossing notifications issued by the mobile device that correspond to that group member ID; and
  if the activity status of a group member ID is inactive, the controller is configured to not update the geofence status for that group member ID in the memory using geofence crossing notifications issued by the mobile device that correspond to that group member ID.

6. The building automation server of claim 5, wherein the controller is further configured to automatically assign the inactive status to a group member ID if no geofence crossing notification from the mobile device that correspond to that group member ID is detected over a predetermined length of time.

7. The building automation server of claim 6, wherein the controller is further configured to automatically assign an active status to a group member ID that has an inactive status if a geofence crossing notification issued by the mobile device that correspond to that group member ID is detected.

8. The building automation server of claim 1, wherein the controller is further configured to associate more than one mobile device with a group member ID.

9. The building automation server of claim 1, wherein if more than one mobile device associated with a group member ID have location services, the controller is configured to use the last received geofence crossing notification when identifying the geofence status for that group member ID.

10. The building automation server of claim 8, wherein the more than one mobile device comprises a smartphone and a tablet, and wherein the controller is further configured to recognize geofence crossing notifications issued by the smart phone but does not recognize geofence crossing notifications issued by the tablet.

11. The building automation server of claim 10, wherein the controller is configured to accept set point changes via the smartphone and tablet.

12. The building automation server of claim 1, wherein if a mobile device that corresponds to a group member ID does not have location services available when crossing the geofence associated with the corresponding user account, but the location services of the mobile device subsequently become available later, the controller is configured to receive a current position of the mobile device relative to the geofence and update the geofence status for that group member ID accordingly.

13. The building automation server of claim 1, wherein the controller is further configured to grant an ADMIN status to one or more of the group member ID's for each of the plurality of user accounts, and wherein the group member ID(s) that have the ADMIN status have additional rights relative to group member ID(s) that do not have the ADMIN status.

14. The building automation server of claim 1, wherein the controller is further configured to grant a USER status to one or more of the group member ID's and optionally assign a GUEST status to one or more of the group member ID's, wherein the group member ID(s) that have been assigned the GUEST status have less rights relative to group member ID(s) that have been assigned the USER status.

15. The building automation server of claim 1, wherein the controller is further configured to send one of the mobile devices a request to temporarily turn on GPS functionality within the mobile device and to return a GPS location to the controller.

16. The building automation server of claim 1, wherein the controller is further configured to receive an indication from one or more of the mobile devices a current location of the mobile device not in response to the mobile device crossing the geofence that is associated with the corresponding user account.

17. A building automation server comprising:
  a memory for storing a database comprising a plurality of user accounts each corresponding to a different building, wherein each user account includes an associated building location of the corresponding building, an associated geofence defined relative to the building location, and a plurality of group member ID's, wherein each of the plurality of group member ID's is associated with a corresponding mobile device with location services, and each user account identifies a geofence status for each of the plurality of group member ID's, where the geofence status indicates whether the corresponding mobile device for each of the plurality of group member ID is within the geofence associated with the user account or outside of the geofence;
  a communication interface;
  a controller coupled to the memory and the communication interface, the controller configured to receive via the communication interface indications issued by the mobile devices of the geofence status of the mobile devices, and thus the geofence status of the plurality of corresponding group member ID's;
  the controller is further configured to recognize when the geofence status of all of the plurality of group member ID's of a user account are outside of the geofence that is associated with the user account, and interprets the building that is associated with the user account as being unoccupied, and recognize when the geofence status of at least one of the plurality of group member ID's of the user account is inside of the geofence that is associated with the user account, and interprets the building that is associated with the user account as occupied or soon be occupied;

the controller is further configured notify a building controller of the building associated with the user account via the communication interface that the building has become unoccupied when the controller interprets the building that is associated with the user account as being unoccupied, wherein in response, the building controller is configured to change at least one building control parameter to an unoccupied setting, and control the building associated with the user account in accordance with the unoccupied setting; and the controller is further configured to notify the building controller of the building associated with the user account via the communication interface that the building has become occupied or will soon to be occupied when the controller interprets the building that is associated with the user account as being occupied or soon to be occupied, wherein in response, the building controller is configured to change at least one building control parameter to an occupied setting, and control the building associated with the user account in accordance with the occupied setting.

18. A method comprising:

establishing communication between a mobile device and a building automation server, wherein the mobile device includes location services and a mobile device identifier, the building automation server references a database that comprises a plurality of user accounts each corresponding to a different building, wherein each user account includes an associated building location of the corresponding building, an associated geofence defined relative to the building location, and a plurality of group member ID's, wherein each of the plurality of group member ID's is associated with a corresponding mobile device identifier, and each user account identifies a geofence status for each of the plurality of group member ID's, where the geofence status indicates whether the corresponding mobile device for each of the plurality of group member ID is within the geofence associated with the user account or outside of the geofence;

associating the mobile device identifier of the mobile device with a corresponding group member ID of a corresponding one of the plurality of user accounts in the database of building automation server;

storing in the mobile device the geofence that is associated with the building that corresponds to the corresponding one of the plurality of user accounts, the geofence having an inside and an outside; and sending a geofence crossing notification from the mobile device to the building automation server when the location services of the mobile device indicates that the mobile device has crossed the geofence stored in the mobile device and whether the crossing was from the inside of the geofence to the outside or from the outside of the geofence to the inside based on the received geofence crossing notification, the building automation server updating the geofence status of the group member ID that corresponds to the mobile device, and recognizing when the geofence status of all of the plurality of group member ID's of the corresponding one of the plurality of user accounts are outside of the geofence associated with the corresponding one of the plurality of user accounts, and interpreting the building that is associated with the corresponding one of the plurality of user accounts as being unoccupied, and recognizing when the geofence status of at least one of the plurality of group member ID's of the corresponding one of the plurality of user accounts is inside of the geofence that is associated with the corresponding one of the plurality of user accounts, and interpreting the building that is associated with the corresponding one of the plurality of user accounts as occupied or soon be occupied; and wherein in response to a detected change in the occupancy status of the building that is associated with the corresponding one of the plurality of user accounts, the building automation server sending one or more control signals to a building controller of the building that corresponding to the corresponding one of the plurality of user accounts, and in response, the building controller changing at least one building control parameter and controlling the building in accordance with the changed at least one building control parameter.

19. The method of claim 18 further comprising:

accepting a geofence disable input via a user interface of the mobile device, and in response to accepting the geofence disable input, sending an instruction to the building automation server that the mobile device has a disabled status and should no longer be considered for geofencing.

20. The method of claim 19 further comprising:

accepting an geofence enable input via a user interface of the mobile device, and in response to accepting the geofence enable input, sending an instruction to the building automation server that the mobile device has an enabled status and should be considered for geofencing.

21. The method of claim 18 further comprising:

accepting a set point change via a user interface of the mobile device, and in response to accepting the set point change, sending an instruction to the building automation server to change a set point of the building controller.

22. The method of claim 18 further comprising:

upon activation of the location services of the mobile device, establishing communication between the mobile device and the building automation server and sending an indication of a current location of the mobile device to the building automation server.

* * * * *